L. STEINBERGER.
INSULATOR STRAIN MEMBER.
APPLICATION FILED NOV. 26, 1918.
1,426,788.
Patented Aug. 22, 1922.
2 SHEETS—SHEET 1.
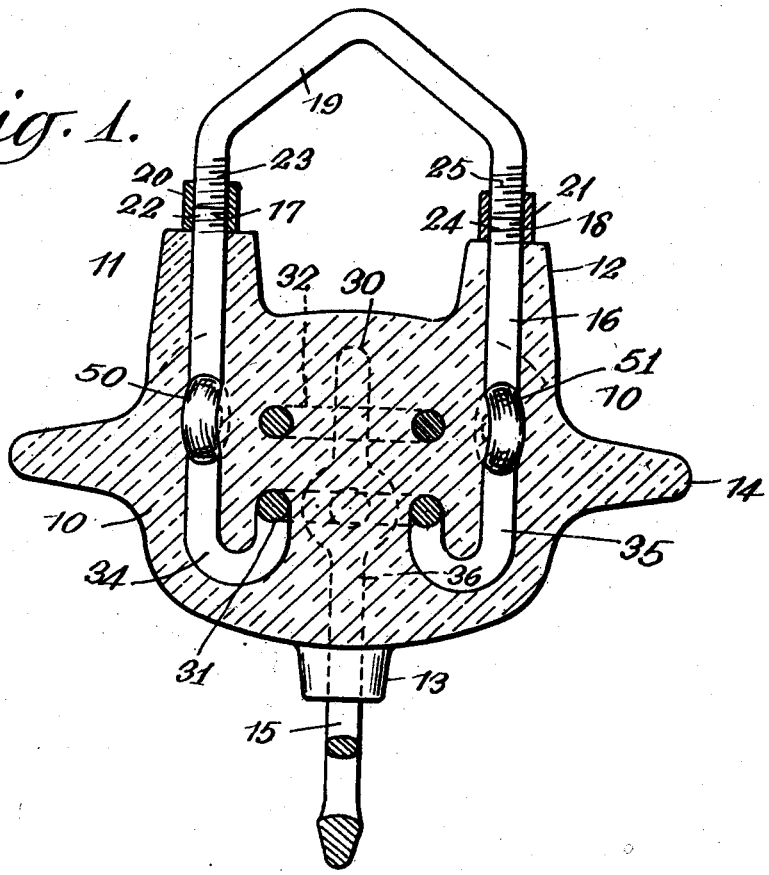
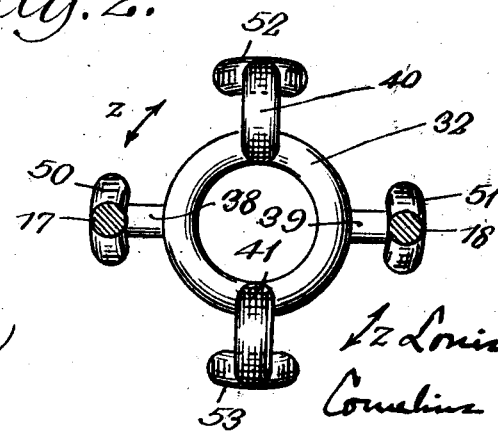
WITNESS
INVENTOR
Louis Steinberger
BY
ATTORNEY L. STEINBERGER.
INSULATOR STRAIN MEMBER.
APPLICATION FILED NOV. 26, 1918.
1,426,788.
Patented Aug. 22, 1922.
2 SHEETS—SHEET 2.
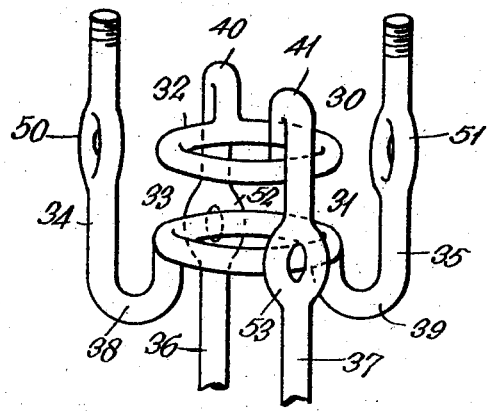
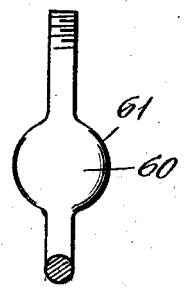
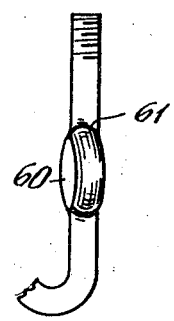

UNITED STATES PATENT OFFICE.

LOUIS STEINBERGER, OF BROOKLYN, NEW YORK.

INSULATOR STRAIN MEMBER.

1,426,788.  Specification of Letters Patent.  Patented Aug. 22, 1922.

Application filed November 26, 1918. Serial No. 264,146.

*To all whom it may concern:*

Be it known that I, LOUIS STEINBERGER, a citizen of the United States, and a resident of the borough of Brooklyn, city and State of New York, have invented certain new and useful Improvements in Insulator Strain Members, of which the following is a specification.

My invention relates to an insulator construction, having particular reference to the type and formation of the strain members embedded within the insulator body, and it is another specific form of insulator strain member from that disclosed and claimed in my co-pending application, Serial No. 231,336, filed April 29, 1918.

One of the objects of my invention is to provide an insulator with strain members of such construction as to distribute the stresses and strains within the body of the insulator and thereby not only lessen the tendency to puncture but also to lessen the concentration of heat in the central portion of the insulator body within which the strain members are embedded.

Another object of my invention is to so construct the strain members of an insulator body that the bridge portions thereof will act as stress distributors and will operate with circular formations projecting from the legs of the strain members to distribute the stresses and strains within the center of the body of the insulator, and thus eliminate the concentration of electrical energy at any point.

Another object of my invention is to provide strain members having ring shaped bridge portions and circular formations on the legs of the strain members, the legs of each strain member being situated opposite the ring shaped bridge portion of the adjacent strain member when embedded in the center of the body of the insulator for the purpose of uniformly and efficiently distributing the stresses and strains within the body of the insulator in zones situated between the ring shaped bridge portion of one strain member and circular formations on the leg portions of the other strain member.

Another object of my invention is to provide strain members having ring shaped bridge portions and ring shaped formations on the legs of the strain members, the legs of each strain member being situated opposite the ring shaped bridge portion of the adjacent strain member when embedded in the center of the body of the insulator for the purpose of uniformly and efficiently distributing the stresses and strains within the body of the insulator in zones situated between the ring shaped bridge portion of one strain member and the ring shaped formations on the legs of the other strain member.

Other objects will appear from the hereinafter specification and claims.

Referring to the drawings:

Fig. 1 is a view partly in section, partly in side elevation of a structure embodying my invention.

Fig. 2 is a plan in detail of an assemblage of strain members embodying my invention in the position in which they are placed in the body of the insulator when molded therein.

Fig. 3 is a perspective side view of an assemblage of strain members embodying my invention showing their position in the body of the insulator.

Fig. 4 is a detail of a leg portion of a strain member, said leg portion being shown broken away, illustrating another specific embodiment of my invention.

Fig. 5 is a side view of the structure shown in Fig. 4.

The insulating material forming the body of my insulator may be of any suitable kind, but I prefer to use the insulating material known in the art as "Electrose", and the remaining parts are formed of any suitable metal or alloys thereof.

Referring to the drawings, 10 is a body of insulating material which may be of any suitable shape, but I have chosen to illustrate a body having a contour as shown in the drawing, in which the insulating material is molded around the leg portions of each strain member to form projections 11, 12 and 13 (the fourth not shown in the drawing) and there is also a central radially projecting flange 14 extending from the insulator body.

15 is an integral strain member, a portion of which is embedded in the insulator body and 16 is the embedded portion of a two-part strain member having legs 17 and 18 projecting from the side of the body of the insulator. 19 is the complementary portion of the two-part strain member which is secured to the projecting ends 17 and 18 of the embedded portions by means of nuts 20 and 21 engaging the screw-threads 22, 23 and 24, 25 on the respective ends of the leg portions 17 and 18 of the strain member, as well known in this art.

The strain members are provided with bridge portions 30 and 31 which consist of rings 32 and 33 each of which is substantially circular in cross section and integrally secured to the embedded leg portions 34, 35, 36, and 37 of the respective strain members by means of offset arms 38, 39, 40 and 41, as shown. The strain members are interlocked one with the other so that in case the insulating material should be destroyed the line will not fall to the ground and they are so situated with respect to each other that the respective rings of the bridge portions of the strain members will be oppositely disposed to each other in the central portion of the body of insulating material.

The ring portions of the strain members not only function as electrical strain distributors but at the same time function as uniform mechanical strain distributors; furthermore, they permit the formation of a solid insulation through the center of the insulator body from face to face thereof.

Because of the open or skeleton construction due to the oppositely disposed ring portions, the generation of heat in the central portion of the insulator body is very much lessened.

As will be seen from the drawings, the legs of the strain members are disposed near the outer side surface of the body of the insulator so that the generated heat may be carried off quickly from the inner portion of the body of the insulator to prevent the deleterious effects of the heat due to the retention thereof in the central portion of the insulator.

The amount of offset or length of offset between the leg portions and the ring portions of the strain members is determined by the voltages to be used or applied to the insulator.

As will be readily understood, the greater the space between the ring of one strain member and the leg of the other strain member, the greater will be the insulation value of the insulator.

At an intermediate point in each leg of the strain members, which are embedded in the body of insulating material, there is a metallic ring 50, 51, 52 and 53 (illustrated in Figs. 1 to 3 inclusive) which rings are curved in the plan view so as to be concentric with the ring shaped bridge portions of the adjacent strain members, the curvature of said rings 50, 51, 52 and 53 being clearly illustrated in Fig. 2 by the double pointed arrows z. These ring shaped portions on the arms or legs of the strain members are so situated thereon that when the strain members are assembled for molding in the insulator body, each pair on one strain member is placed directly opposite the ring shaped bridge portions of the other strain member and the central portion of the rings or circular formations on the arms or legs of the strain members will lie in the same horizontal plane with the ring shaped bridge portions of the adjacent strain members.

The outer circumference of each of the rings 50 to 53 which is integral with the leg or arm portions of the strain members is substantially equal to one half of the circumference of the ring shaped bridge portions of the strain members in order that the lines of stress between the adjacent metal portions of the strain members will be evenly distributed in zones situated between the ring shaped bridge portion of one strain member and the oppositely disposed rings which are integral with the leg or arm portions of the other strain member.

In Figs. 4 and 5 I have shown another embodiment of my invention in which solid discs 60 with rounded peripheries 61 are formed on the leg or arm portions of the strain members to function in a similar manner as the rings hereinabove described.

It is therefore seen from these constructions that the electrical strains and stresses will be distributed between the rings or discs constituting the circular members projecting from the leg portions of one strain member and the ring shaped bridge portion of the adjacent strain member. These projecting rings or discs shown in each of the figures of the drawing serve to evenly distribute the electrical strains and stresses within the center of the insulating body with the result that the concentration of the lines of stress and also the zones of heat within the body of insulating material is very much lessened and the danger of breakage due to the otherwise concentrated lines of strains and stresses is prevented.

As changes of construction could be made within the scope of my invention, it is intended that all matter contained in the above description or shown in the accompanying drawings shall be interpreted as illustrative and not in a limiting sense.

Having now described my invention, what I claim as new and desire to secure by Letters Patent is:

1. In a device of the kind described, an insulating body, interlocked strain members embedded therein, said strain members embodying bridges, pairs of stress distributing rings, the rings of each pair being on opposite sides of the bridge of the other strain member.

2. In a device of the kind described, an insulating body, interlocked strain members embedded therein, said strain members consisting of leg portions and ring shaped bridge portions oppositely disposed to each other, and circular elements forming a portion of the leg portions of one strain member and extending therefrom in a line concentric with the bridge portion of the other strain member.

3. In a device of the kind described, an insulating body, interlocked strain members embedded therein, said strain members consisting of leg portions and ring shaped bridge portions oppositely disposed to each other, and rings forming a portion of the leg portions of one strain member and extending therefrom in a line concentric with the bridge portion of the other strain member.

4. In a device of the kind described, a strain member consisting of leg portions connected by a bridge member, said bridge member embodying a ring, other rings forming a portion of said leg portions and situated opposite each other and each lying in the circumference of the same circle.

5. In a device of the kind described, an insulating body, interlocked strain members embedded therein, said strain members consisting of leg portions and bridge portions oppositely disposed to each other, and ring shaped portions forming a portion of the leg portions, the center of each of said ring portions being situated in the horizontal plane of the bridge portion of the other strain member.

6. In a device of the kind described, a strain member, said strain member embodying a ring shaped bridge portion and leg portions, said leg portions secured to the said ring portion and extending at right angles thereto, circular shaped elements forming a portion of the leg portions, said circular shaped elements being concentric to the ring of the bridge portion, the circumference of the circular shaped elements being substantially equal to one half the circumference of the bridge portion.

7. In a device of the kind described, an insulating member, a strain member embedded therein, said strain member having leg portions and a bridge element therebetween embodying a ring shaped portion, the leg portions extending opposite from said ring shaped portion and each of the leg portions being provided with oppositely disposed extensions combining to form a circular shaped element, the center of the said circular shaped element lying in substantially the same horizontal plane with the ring portion of the bridge of the adjacent strain member said circular shaped element extending in a curved line concentric with the ring shaped bridge portion.

In witness whereof, I have hereunto set my hand at the borough of Manhattan, city and State of New York, this 19th day of November, 1918.

LOUIS STEINBERGER.

In presence of:
ZITA M. GRAHAM.